UNITED STATES PATENT OFFICE.

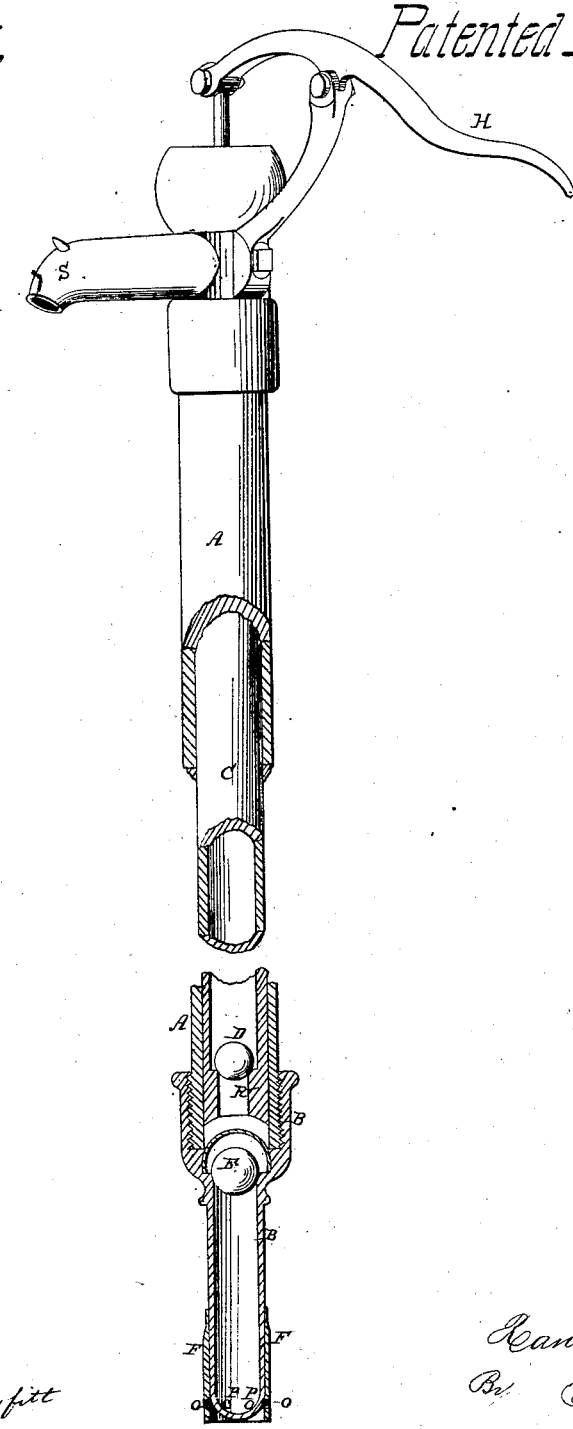
R. E. Strait,
Pump Lift,
No 57,595. Patented Aug. 28, 1866.
Witnesses.
Inventor:
Ransom E. Strait
By Munn & Co
Attorneys

RANSOM E. STRAIT, OF WEST ONEONTA, NEW YORK.

IMPROVEMENT IN PUMPS.

Specification forming part of Letters Patent No. 57,595, dated August 28, 1866.

*To all whom it may concern:*

Be it known that I, RANSOM E. STRAIT, of West Oneonta, in the county of Otsego and State of New York, have invented a new and useful Improvement in Pumps; and I do hereby declare that the following is a full, clear, and exact description thereof, which will enable others skilled in the art to make and use the same, reference being had to the accompanying drawing, forming part of this specification, in which—

Figure 1 is a side elevation of my pump, showing also the interior parts.

My invention consists in an arrangement of devices by means of which quicksand or other impurities in the water are prevented from passing up the pump-tube with the water.

In the drawing, H is the handle; S, the spout, and A the suction-tube, to the lower end of which is screwed the section B.

The suction-tube A B is made of sufficient length to extend below the surface of the water in the well, whatever be its depth, while the distance from the surface of the water in the well to the bottom of the plunger when it arrives at its highest position must be somewhat less than thirty feet, or the height which the atmosphere will raise a column of water in vacuum.

C is a long hollow plunger fitting accurately in the suction-tube A, and having a ball-valve, D, in its lower part, made to fit closely in its valve-seat R. The plunger C is operated by means of the handle H.

E is a ball-valve placed in the suction-tube, and governed in its upward movement by the open plate T.

F is a thimble suitably attached to the lower end of the suction-tube, and having openings O O for the passage of water. The lower portion of the suction-tube has openings P P in its end, which are so situated with regard to the holes O O in the thimble that the water in passing into the suction-tube will take a tortuous course, and the sand and other impurities in the water will thus be arrested.

The operation of the pump is as follows: When the hollow plunger is at its lowest position and the handle depressed so as to raise the plunger, a vacuum will be created, and the water will enter the suction-tube and pass above the ball-valve E. When the plunger again descends the valve E will close, the valve D will open, and water will pass up into the hollow plunger. In the next ascending movement of the plunger the valve D will be closed by the weight of the column of water in the hollow plunger and by reason of the vacuum below the plunger, and the water in the plunger will pass out of the spout. By thus lengthening the suction-tube and hollow plunger and arranging them as described, water may be raised from any depth.

An arrangement may be made for raising the ball-valve D to allow the waste water to run back into the well, in order to prevent freezing when the pump is not used; or a waste-water passage may be used. An additional valve may also be used.

Having thus fully described my invention, what I claim as new, and desire to secure by Letters Patent, is—

In combination with the suction-tube A B, having apertures P P, the thimble F, with its openings O O, constructed and operating in the manner and for the purpose set forth.

RANSOM E. STRAIT.

Witnesses:
S. M. OLIN,
ROSWELL WHITNEY.